United States Patent [19]
Birke
[11] Patent Number: 5,071,507
[45] Date of Patent: Dec. 10, 1991

[54] PASTING MACHINE IN A CORRUGATOR

[75] Inventor: Norbert Birke, Hitzhusen, Fed. Rep. of Germany
[73] Assignee: Peters Maschienfabrik GmbH, Hamburg, Fed. Rep. of Germany

[21] Appl. No.: 358,703
[22] Filed: May 30, 1989
[30] Foreign Application Priority Data
Jun. 1, 1988 [DE] Fed. Rep. of Germany ........ 3828658
[51] Int. Cl.5 .......................... B31F 1/20; B32B 31/04
[52] U.S. Cl. .................................... 156/470; 156/543; 156/547; 156/549; 156/550; 156/551
[58] Field of Search ................ 156/205, 324, 470, 311, 156/543, 547, 549-551

[56] References Cited

U.S. PATENT DOCUMENTS 3,769,129 10/1973 Williams .......................... 156/324 X
3,788,932 1/1974 Klinkosch ........................ 156/549 X
4,267,008 5/1981 Owens ............................. 156/470 X
4,681,722 7/1987 Carter et al. ..................... 156/324 X

FOREIGN PATENT DOCUMENTS 1561524 4/1970 Fed. Rep. of Germany .

OTHER PUBLICATIONS

K. Ruger, "Vortragsreihe Verklebungen bei der Herstellung und Verarbeitung von Wellpappe Einflusse des Papiers", [English Abstract, The Pasting Processes During the Production and Converting of Corrugated Board—An Introduction].

*Primary Examiner*—David A. Simmons
*Assistant Examiner*—Thi Dang
*Attorney, Agent, or Firm*—Vidas & Arrett

[57] ABSTRACT

A pasting machine in a corrugator which is arranged downstream of at least one single face corrugated cardboard machine and the heating section thereof including hot plates along which the webs to be glued to each other and being arranged on top of each other are guided while being compressed by pressing means being directed towards the hot plates from above, wherein the heating section is divided into at least two sections being arranged in spaced relation to each other in working direction, a glue station is arranged in the intermediate space between the hot plate sections and feeding means for a web being associated with the intermediate space are provided below the working level of the pasting machine.

7 Claims, 3 Drawing Sheets

PASTING MACHINE IN A CORRUGATOR

The invention relates to a pasting machine in a corrugator as claimed in the preamble of patent claim 1. A pasting machine in a corrugator has the objective to activate the glue between webs being arranged on top of each other and to provide the glueing. For this purpose, the pasting machine comprises hot plates which as an example are heated with steam. The webs to be glued and being arranged on top of each other are moved along the surfaces of the hot plates and are pressed against the hot plates by means of pressing means. As an example, this is accomplished by means of a belt and/or rolls, but also by means of compressed air which is generated within a hood which is arranged above the hot plates. Usually, a pasting machine is divided into a heating section and a pulling section. In first place, the pulling section serves for the translatory movement of the corrugated cardboard wherein mandatorily a cooling is attained in this area as there is no heating provided. It must not be considered in the following considerations. In the simplest case, the glueing of a single face corrugated single face web with an outer covering web is attained in the pasting machine. For this purpose, both webs are guided over preheating cylinders and the single face web is provided with glue in a glue station, more specifically, the tips of the corrugations of the single face web are coated with glue to glue the outer covering web with the tips of the corrugations. Frequently, however, also two or three single face webs have to be connected to each other. For this purpose, the single face webs are each separatedly guided parallel over a preheating cylinder and a glue station wherein the outer covering web is guided to the pasting machine in the manner described above. In the simplest case as described above, the heat of the hot plates must penetrate through the outer covering web in order to get to the glue. In the case of multi-corrugated cardboard, the heat must penetrate through the outer covering web and at least one single face web in order to get to the glue between two single face webs. The heat transfer capacity of paper is not particularly good. A larger heat transfer resistance is formed by a single face corrugated web, wherein the corrugation contacts the covering webs only in linear contacts. Therefore, it will take a relatively large time span until in a multi-corrugated cardboard a satisfactory temperature is reached also within the layers in order to provide for the desired activation of the glue. There are glues which can be actuated even at lower temperatures, however, these are relatively expensive and costly as compared with usual common place glues. Because of the phenomenon described, only a relatively low production speed can be attained in the manufacture of multi-corrugated cardboard. In case a higher production speed has to be attained, so much heat has to be applied in the first part of the heating section that there is the danger to overheat the glue and/or the paper in the lower webs. Thereby, however, poorer glueing is attained and/or a burning of the corrugated cardboard and/or a warping will occur. In any case, a deterioration of the quality of the corrugated cardboard will result.

Therefore, it is the object of the invention to provide a pasting machine in a corrugator which enables a high production speed also with multi-layer-corrugated cardboard.

This object is attained by the features of the characterizing part of patent claim 1.

The pasting machine or the heating section thereof, respectively, according to the invention is divided into at least two sections arranged in spaced relation to each other in working direction In the intermediate space between the heating section portions, a glue station is arranged below the working level thereof which engages the underside of the lowermost web. Below the working level of the pasting machine, furthermore, a feeding means is associated with each intermediate space for feeding a web to the following section. In a pasting machine constructed in such a way, either a single face web and a covering web or two single face webs are fed to the first heating section. In case a double face corrugated cardboard web is to be manufactured as an example, the outer covering web is initially fed in the following second heating section. The glue station arranged in the intermediate space between the heating sections applies the glue onto the tips of the corrugations of the lower web such that the covering web can be glued to the lower single face web in the following heating section. In case a triple face corrugated cardboard has to be produced, the third single face web is fed into the intermediate space between the first two heating sections whereas the outer covering web is fed into the intermediate space between the second and third heating section.

As the feeding of the single face corrugated cardboard and the covering web is not accomplished at one point in time and at one spot as in accordance with prior art, but one after the other and along the length of the pasting machine at two to three spots, as an example, higher production speeds may be accomplished. The heat required for gelatinization of the glue must not be applied at once for all papers to be glued but the process of applying heat is attained stepwise instead. This advantage is maintained without significantly enlarging the total length of the pasting machine. Moreover, the pasting machine according to the invention, favours the processing of printed or otherwise surface-treated outer covering webs. The reason is that these webs with their sensitive surfaces must not be pulled over all hot plates for an unnecessarily long time. Therefore, they are not subject to the relatively high pressure and the heat in the first hot plate sections. Therefore, a significant increase of quality is maintained. Depending on which cardboard has to be manufactured, the use of a glue station in the intermediate space between heating sections arranged in sequence is not required. Therefore, an embodiment of the invention provides that the glue station arranged in the intermediate space is adjustable in height. For practical purposes, the glue station is constructed such that the periphery of the glue application roll projects somewhat out of the level of the hot plate surface. In case the glue station is not required, it will be adjusted downwards a small distance such that it will not engage the lower web. It is understood that an adjustment of the application roll is possible instead of a total adjustment of the glue station.

When processing multi-face corrugated board, a part of the webs is fed in the intermediate spaces which for that reason will comprise corresponding feeding means. The feeding of the webs can also be accomplished below the heating section. As an alternative, the webs may also be fed laterally. In any case, it is useful according to a further embodiment of the invention that the feeding means comprise a heating cylinder or the like.

By arranging a heating cylinder, immediately prior of a heating section only a significant cooling will occur between the heating cylinder and the heating section such that the latter must heat the associated web only up to a lower temperature compared, as an example, with the state of the art wherein the heating cylinders are arranged prior to the glue station and therefore comprise a relatively large distance to the pasting machine. Therefore, in the pasting machine according to the invention less heat energy is required compared with prior art.

As has been mentioned before, a glue station and a preheating device have to be associated with the first heating section. In this connection, a further embodiment of the invention provides that two preheaters and one glue station are arranged upstream, one preheater is arranged prior of the glue station and the other preheater is arranged immediately at the beginning of the heating section. Only one heating cylinder, therefore, has to be arranged in a certain distance to the pasting machine. The glue station arranged upstream for practical purposes is also adjustable.

In the pasting machine according to the invention, the lower single face web will abut against the hot plates with its corrugation when processing double face or triple face corrugated cardboard. In prior art pasting machines, the hot plates are arranged transversely to the working direction. In this transverse arrangements, inregularities between the hot plates may occur and impair the corrugations under certain circumstances. Therefore, an embodiment of the invention provides that parallel hot plates extend in longitudinal direction in the heating sections. In this way, no inregularities may occur in the heating sections at which the corrugations might be damaged.

In a further embodiment of the invention, the first single face web is fed immediately to the first heating section and the associated covering web is fed over a preheating cylinder in the intermediate space between the first and second heating section. In this embodiment, a glue station or a preheater, respectively, arranged upstream are no longer necessary. The space required by the glue station and the preheater, therefore, is totally available for the consequent unit. However, it is necessary to enlarge the heating section by a fourth section in case triple face corrugated cardboard has to be manufactured.

The invention will now be described in details referring to an example of an embodiment in which:

Figure 1:
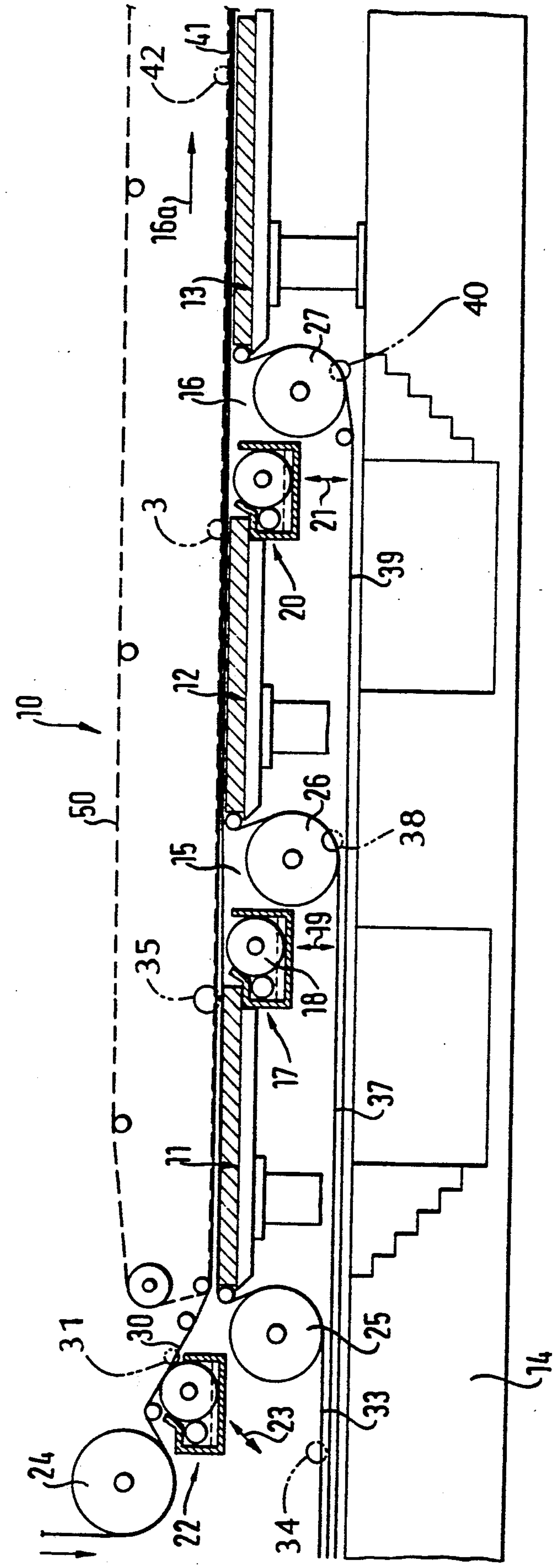
FIG. 1 diagrammatically shows a lateral view of a pasting machine according to the invention and FIG. 1*a* is an enlarged fragmentary detail taken from the area encircled at 31 in FIG. 1.

Before referring to the details illustrated in the drawings, it is stated that each feature per se or in combination with features of the claims is of significance for the invention.

DETAILED DESCRIPTION OF THE DRAWINGS

A pasting machine 10 in a corrugator (not shown) comprises three heating sections 11, 12 and 13 which are arranged at a base 14. Between those, intermediate spaces 15 or 16, respectively, are provided. The parallel hot plates which are not illustrated in details extend in working direction, i.e. in direction of the arrow 16. A glue station 17 is arranged in the intermediate space 15, the application roll thereof defining the highest point of the glue station 17. The glue station 17 is adjustable in height as indicated by the double arrow 19. A second glue station 20 is arranged in the intermediate space 16. It also is adjustable in height according to the double arrow 21. A glue station 22 is arranged prior to the first heating section 11 which glue station is also adjustable in its position corresponding to double arrow 23. A preheating cylinder 24 is arranged prior to the glue station 22. Immediately prior to the heating section 11 below the working level thereof, a second preheating cylinder 25 is positioned. Preheating cylinders 26, 27 are arranged in the intermediate spaces 15 and 16, the preheating cylinders being also arranged below the working levels of the associated heating sections 12 or 13, respectively.

The pasting machine as illustrated operates as follows. A single face corrugated web 30 (also indicated by the double circle 31) is fed to the glue station 22 over the preheating cylinder 24. In case only a single face corrugated web has to be produced, a covering web is fed over the preheating cylinder 25, the covering web being glued to the single face web 30 in the usual way, wherein the latter is provided with glue by means of the glue station 22. A weighing belt 50 being defined as an endless belt is arranged with the working part thereof above the heating sections 11, 12 and 13 in order to press the webs against the heating sections.

In case a double face corrugated web has to be produced, a second single face web 33 is fed over the preheating cylinder 25 as is also indicated by the double circle 34. Therefore, two single face webs are glued to each other in the heating section 11 as is indicated by the double circle 35.

The covering web is fed over the preheating cylinder 26, the covering web being glued to the double face corrugated web 35. In case finally a triple face corrugated web has to be produced, a third single face web 37 is fed over the preheating cylinder 26 as is also indicated by the double circle 38. Consequently, the covering web 39 is fed over the preheating cylinder 27 as is also indicated by the double circle 40. Therefore, the triple face corrugated web 41 is defined in the last heating section 13 as is also indicated by the double circle 42.

It is obvious that the single webs are fed stepwise one after the other such that the heat created by the heating sections 11, 12 and 13 has to penetrate only one covering web or one single face web, respectively, each, in order to get to the glueing spot. In case the glue stations 17 and 20 are not required, they will be adjusted in order to not engage the associated web.

In the example, all webs to be fed into the intermediate spaces 15 and 16 are fed in working direction below the pasting machine. It is understood that these webs may also be fed laterally by corresponding deflection rolls.

Figure 2:
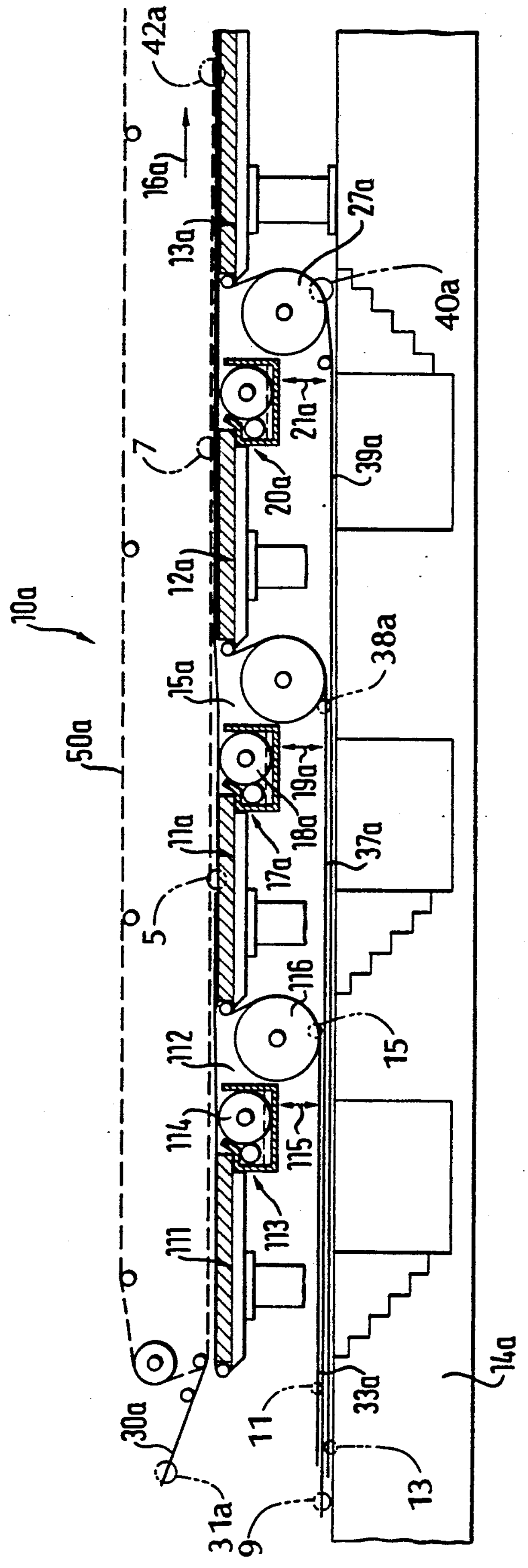
FIG. 2 diagrammatically shows a second embodiment of the pasting machine according to the invention.
Figure 1A:
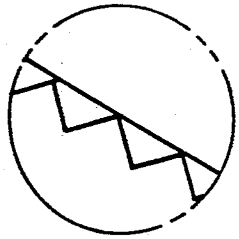
Figure 1B:
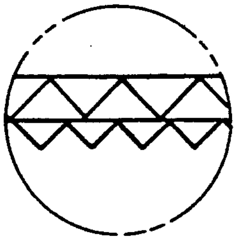
FIG. 1*b* is an enlarged fragmentary detail taken from the area encircled at 35 in FIG. 1.
Figure 1C:
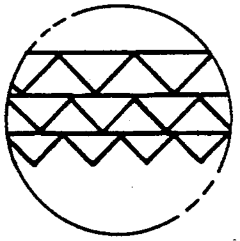
FIG. 1*c* is an enlarged fragmentary detail taken from the area encircled at 3 in FIG. 1.
Figure 1D:
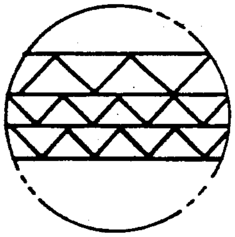
FIG. 1*d* is an enlarged fragmentary detail taken from the area encircled at 42 in FIG. 1.
Figure 1E:
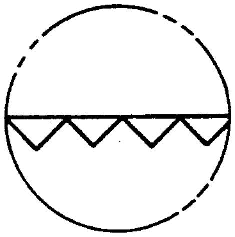
FIG. 1*e* is an enlarged fragmentary detail taken from the area encircled at 34 in FIG. 1.
Figure 1F:
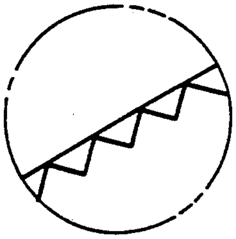
FIG. 1*f* is an enlarged fragmentary detail taken from the area encircled at 38 in FIG. 1.
Figure 1G:
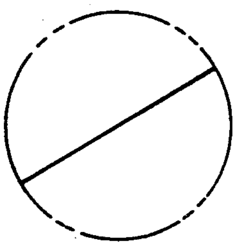
FIG. 1*g* is an enlarged fragmentary detail taken from the area encircled at 40 in FIG. 1.
Figure 2A:
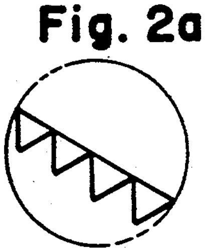
FIG. 2*a* is an enlarged fragmentary detail taken from the area encircled at 31*a* in FIG. 2.
Figure 2B:
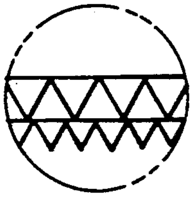
FIG. 2*b* is an enlarged fragmentary detail taken from the area encircled at 5 in FIG. 2.
Figure 2C:
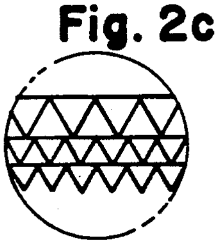
FIG. 2*c* is an enlarged fragmentary detail taken from the area encircled at 7 in FIG. 2.
Figure 2D:
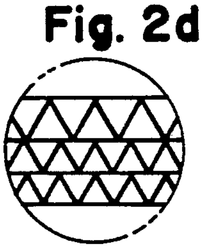
FIG. 2*d* is an enlarged fragmentary detail taken from the area encircled at 42*a* in FIG. 2.
Figure 2E:
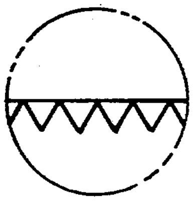
FIG. 2*e* is an enlarged fragmentary detail taken from the area encircled at 9 in FIG. 2.
Figure 2F:
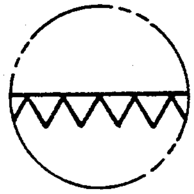
FIG. 2*f* is an enlarged fragmentary detail taken from the area encircled at 11 in FIG. 2.
Figure 2G:
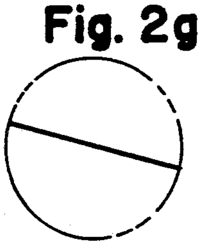
FIG. 2*g* is an enlarged fragmentary detail taken from the area encircled at 13 in FIG. 2.
Figure 2H:
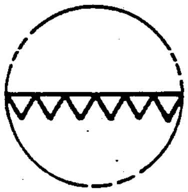
FIG. 2*h* is an enlarged fragmentary detail taken from the area encircled at 15 in FIG. 2.
Figure 2I:
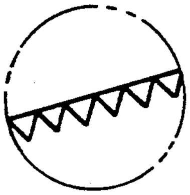
FIG. 2*i* is an enlarged fragmentary detail taken from the area encircled at 38*a* in FIG. 2.
Figure 2J:
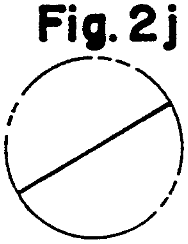
FIG. 2*j* is an enlarged fragmentary detail taken from the area encircled at 40*a* in FIG. 2.

In the example in FIG. 2, all parts as far as they are illustrated and described in FIG. 1 will carry the same numerals with the addition of the prefix a. It is obvious that a glue station and a preheating cylinder as diagrammatically illustrated in FIG. 1 are not provided. Instead a heating section 111 is arranged prior to the first heating section 11 in FIG. 1, the heating section 111 resembling the other heating sections 11*a*, 12*a* and 13*a* in design. It is arranged in spaced relation to the heating section 11*a* and thereby forms an intermediate space 112, wherein a glue station 113 with an application roll 114 is arranged. The glue station 113 is adjustable in height according to double arrow 115. Furthermore, a heating cylinder 116 is positioned in the intermediate space.

As is obvious, the single face web 30*a* is fed directly from the bridge to the first heating section 11. On the other side, the covering web 33*a* is fed below the first heating section 111 and abutted against the underside of the first single face web over the heating cylinder 116 and glued to the first single face web in the heating section 11*a*. In case double or triple face corrugated cardboards have to be produced, the second or the lower single face web is fed to the second heating section 11*a* over the heating cylinder 116.

Also in the second embodiment, the same advantage is maintained as in the first embodiment that the outer covering web is handled with utmost care and therefore may be preprinted in a suitable way or treated otherwise.

The glue stations according to the embodiments of FIGS. 1 and 2 may be adjustable not only in height but also laterally in order to retract them out of the pasting machine for cleaning purposes, as an example.

I claim:

1. A corrugator pasting machine, the pasting machine being arranged downstream, of at least one single face corrugated cardboard machine and comprising:

at least two heating sections (11, 12, 13; 111, 11*a*, 12*a*, 13*a*) comprising hot plates, arranged in spaced relation to one another in a downstream direction and defining an operating level along which at least two single face corrugated webs (30, 33, 37; 30*a*, 33*a*, 37*a*) and at least one covering web (39; 39*a*) are guided in order to be glued to each other;

pressing means (50; 50*a*) directed towards the hot plates from above for superposing and compressing said webs on each other;

intermediate spaces (15, 16) between every two of the heating sections;

a gluing station (17, 20) arranged in every intermediate space (15, 16); and feeding means (26, 27) provided below the said operating level for successively feeding the said webs to the operating level at the successive intermediate spaces (15, 16) in such a manner that, when processing double-face or treble-face corrugated cardboard, the lower single face web will abut against the hot plates with its corrugations.

2. Pasting machine as claimed in claim 1 in which gluing stations (17, 20) arranged in the intermediate spaces (15*a*) are adjustable in height and/or retractable in lateral direction.

3. Pasting machine as claimed in claim 1 in which each feeding means comprises a heating cylinder (26,27) below the operating level.

4. Pasting machine as claimed in claim 1 in which two preheaters (24, 25) and an auxiliary glue station (22) are arranged upstream of said heating sections, one said preheater (24) being arranged prior to the auxiliary glue station (22) and the other said preheater (25) being arranged immediately at the beginning of a first upstream heating section (11).

5. Pasting machine as claimed in claim 4 in which the auxiliary glue station (22) arranged upstream of said heating sections is adjustable in its position.

6. Pasting machine as claimed in claim 1 further comprising means for feeding a first single face web (30*a*) from above the operating level onto a first heating section (111); and wherein the feeding means comprises a heating cylinder (116) arranged below the operating level and in one of said intermediate spaces between the first heating section and a second heating section (111, 11*a*) and means for feeding a first covering web (33*a*) over the heating cylinder to the operating level.

7. Pasting machine as claimed in claim 1, in which said hot plates are located in the same plane and extend longitudinally in the down stream direction of the webs.

* * * * *